(12) United States Patent
Popescu

(10) Patent No.: US 9,672,224 B2
(45) Date of Patent: Jun. 6, 2017

(54) SOLUTION FOR HIGHLY CUSTOMIZED INTERACTIVE MOBILE MAPS

(71) Applicant: Urban Engines, Inc., Los Altos, CA (US)

(72) Inventor: Catalin Popescu, Los Altos, CA (US)

(73) Assignee: URBAN ENGINES, INC., Los Altos, CA (US)

(*) Notice: Subject to any disclaimer, the term of this patent is extended or adjusted under 35 U.S.C. 154(b) by 20 days.

(21) Appl. No.: 14/657,771

(22) Filed: Mar. 13, 2015

(65) Prior Publication Data
US 2015/0262399 A1 Sep. 17, 2015

Related U.S. Application Data

(60) Provisional application No. 61/953,743, filed on Mar. 15, 2014.

(51) Int. Cl.
*G06D 1/00* (2006.01)
*G06F 17/30* (2006.01)
*G01C 21/32* (2006.01)

(52) U.S. Cl.
CPC ....... *G06F 17/30241* (2013.01); *G01C 21/32* (2013.01)

(58) Field of Classification Search
None
See application file for complete search history.

(56) References Cited

U.S. PATENT DOCUMENTS

| | | | | |
|---|---|---|---|---|
| 9,069,793 | B2* | 6/2015 | Kadowaki | G06F 17/30241 |
| 2007/0143345 | A1* | 6/2007 | Jones | G06F 17/30241 |
| 2009/0027418 | A1* | 1/2009 | Maru | G06F 17/30241 345/629 |
| 2009/0067725 | A1* | 3/2009 | Sasakawa | G01C 11/04 382/190 |
| 2009/0312947 | A1* | 12/2009 | Brandis, Jr. | G01C 21/3423 701/469 |
| 2010/0070309 | A1* | 3/2010 | Deede | G06Q 40/08 705/4 |
| 2010/0302236 | A1 | 12/2010 | Kinnan et al. | |
| 2010/0321399 | A1* | 12/2010 | Ellren | G06F 17/30241 345/587 |
| 2011/0069065 | A1* | 3/2011 | Hiwada | G06T 15/005 345/420 |
| 2012/0331009 | A1* | 12/2012 | Omer | G06F 17/30241 707/802 |
| 2013/0013266 | A1 | 1/2013 | Meiners et al. | |

(Continued)

OTHER PUBLICATIONS

PCT International Search Report and Written Opinion, PCT Application No. PCT/US2015/020528, Jun. 25, 2015, six pages.

*Primary Examiner* — David H Chu
(74) *Attorney, Agent, or Firm* — Marshall, Gerstein & Borun LLP

(57) ABSTRACT

A map customization module builds a customized map for a user based on the user's interest and historical activities. A database stores processed map data including layer data, element data and/or tile data related to maps. The map customization module obtains the necessary processed map data from the database and combines the map data with the user's interests to generate a customized map. The map customization module recognizes the user's interests based on explicit user input and/or implicit user input.

20 Claims, 17 Drawing Sheets

(56) References Cited

U.S. PATENT DOCUMENTS

| | | | |
|---|---|---|---|
| 2013/0124563 A1* | 5/2013 | Cavelie | G06F 17/30241 |
| | | | 707/770 |
| 2014/0118140 A1* | 5/2014 | Amis | G08B 25/08 |
| | | | 340/539.13 |
| 2014/0267393 A1* | 9/2014 | Mitchell | G06T 11/60 |
| | | | 345/632 |
| 2015/0177019 A1* | 6/2015 | Baig | G01C 21/3694 |
| | | | 701/532 |
| 2015/0227808 A1* | 8/2015 | Zharkov | G06K 9/4638 |
| | | | 345/441 |

* cited by examiner

SOLUTION FOR HIGHLY CUSTOMIZED INTERACTIVE MOBILE MAPS

CROSS REFERENCE TO RELATED APPLICATION

This application claims a benefit of, and priority to, U.S. Patent Application No. 61/953,743, filed Mar. 15, 2014, the contents of which is incorporated by reference in its entirety.

BACKGROUND

1. Field of Art

The disclosure generally relates to the field of electronic maps, and specifically to the customizable interactive mobile maps.

2. Description of the Related Art

Mobile maps give users the convenience of accessing geographical information directly on mobile devices. However, the current map solutions have severe limitations. They allow little or no customization. For example, at a particular location and zoom level, the same geographical information is presented to all users. Apparently, there is no point that the solutions show the same highways and roads to a cyclist and a driver. It is also unnecessary for the solutions to show parks, restaurants, and bars at all times and to show all subway routes and bus routes to all commuters.

In addition, traditionally, map data is processed on the server to create graphic image tiles at fixed zoom levels. Then at each zoom level, there are a preset number of elements rendered, such as points of interest (POIs), residential roads, and highways. The drawback is that custom styling cannot be easily applied on the mobile device. At a given location and zoom level, every user is presented with the same map image.

As a result, current mobile map solutions lack the ability to create a personalized map that accurately reflects users' preferences.

SUMMARY

To overcome the problems of current mobile map solutions, the present disclosure provides a system and methods for constructing highly customized interactive maps on mobile devices. The overall experience is that a user can select explicitly or implicitly any elements on the map, the system and methods respond immediately and render the selected elements on screen of the device for the user. This allows personalized maps to be created on demand of the user that accurately reflect the user's preferences.

A computer-implemented method for providing tile data is disclosed. Embodiments of the method comprise collecting, using one or more processors, map data describing a map from a variety of resources; separating, using the one or more processors, the map data into multiple sets of layer data describing multiple layers of the map; dividing, using the one or more processors, each set of layer data into multiple sets of element data describing individual elements in each layer of the map; dividing, using the one or more processors, each set of layer data into multiple sets of tile data, each set of tile data describing a tile of the each layer of the map, each tile including one or more segments of the individual elements; and providing, using the one or more processors, the tile data.

Another aspect provides a computer-implemented method for rendering a customized map to a user. Embodiments of the method comprises receiving, using one or more processors, a user input requesting the customized map from the user; determining, using the one or more processors, user interest associated with the customized map based on the user input; querying, using the one or more processors, for data to build the customized map based on the user interest; receiving, using the one or more processors, the queried data; building, using the one or more processors, the customized map using the queried data; and rendering, using the one or more processors, the customized map to the user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The disclosed embodiments have advantages and features which will be more readily apparent from the detailed description, and the accompanying figures (or drawings).

The FIGS. and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Figure 1:
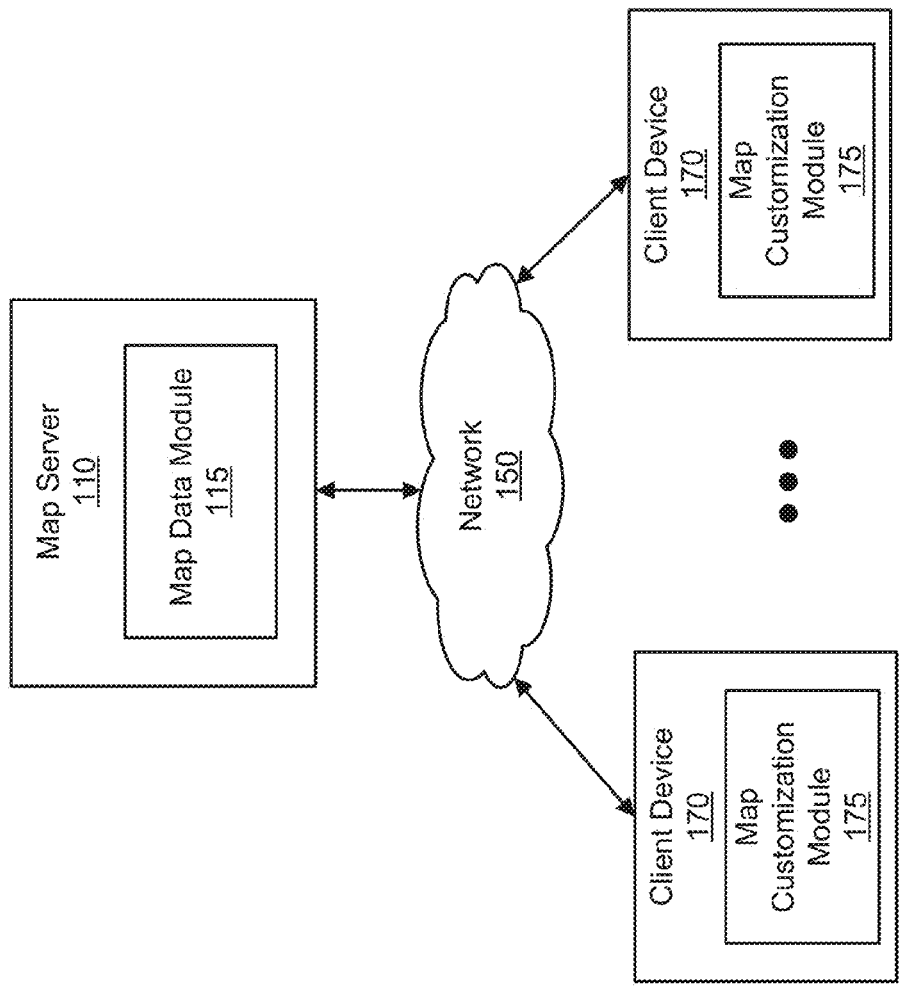
FIG. 1 is a high-level block diagram of a computing environment for supporting customizable interactive maps according to one embodiment.

FIG. 1 shows a computing environment 100 for supporting customizable interactive maps according to one embodiment. The computing environment 100 includes a map server 110, a plurality of client devices 170 and a database 130 connected by a network 150. Only one map server 110, three client devices 170 and one database 130 are shown in FIG. 1 in order to simplify and clarify the description. Embodiments of the computing environment 100 can have many map servers 110, client devices 170 and database 130 connected to the network 150. Likewise, the functions performed by the various entities of FIG. 1 may differ in different embodiments.

The map server 110 stores map data that can be used to render maps for users. In one embodiment, the map server 110 may retrieve raw map data from various different types of resources and process the raw map data to generate processed map data. In addition, the map server 110 provides, via the network 150, the processed map data to client devices 170. In one embodiment, the map server 110 includes a map data module 115. Other embodiments of the map server 110 include different and/or additional components. In addition, the functions may be distributed among the components in a different manner than described herein.

The map data module 115 processes raw map data and provides processed map data to client devices 170. In one embodiment, the map data module 115 collects map data from a variety of resources. The map data describes one or more maps. For example, the map data describes a map for the San Francisco bay area (SF Bay Area) of California. The map data also describes elements of the map of SF Bay Area, including roads, lakes, rivers, forests, buildings, public transportation systems, etc. These elements can construct multiple layers for a map. For example, a first layer of the map includes all the roads; a second layer of the map includes all the lakes; a third layer of the map includes all the rivers; a fourth layer of the map includes all the forests; a fifth layer of the map includes all the buildings; and a sixth layer of the map includes all the public transportation systems. In other words, one layer of a map includes all elements of one type. In one embodiment, the map data module 115 separates the map data into multiple sets of layer data describing the multiple layers of the map. For example, the map data module 115 analyzes the map data to divide the map data into six sets of layer data describing the six layers of the map as described in the above example. One skilled in related art should appreciate that other examples for layers of a map and corresponding division of the map are possible. For example, the map data module 115 divides the map into layers based on shapes of the elements. Each layer includes elements of the same kind of shape. For example, all lakes and forests are separated into one layer; all roads and rivers are separated into one layer; etc.

In addition, in one embodiment, the map data module 115 divides each set of layer data into multiple sets of element data describing individual elements in each layer of the map. For example, with respect to a layer of roads, a first set of element data describes a specific road such as highway 101 in the layer of roads; a second set of element data describes a certain street such as the $23^{rd}$ street in the layer of roads; etc. In another example, a layer describing public transportation systems may be divided into individual routes and/or stops for different transportation vehicles. A first set of element data may describe a route and stops along the route of a certain bus line such as bus line 805; a second set of element data may describe a route and stations on the route of a certain train; and a third set of element data may describe a route and stops of a subway line. The set of element data associated with a certain transportation vehicle can be further divided into route element data describing the route and stop element data describing the stops or stations.

In one embodiment, on one hand, the road and river types of elements can be described using lines and/or points. Accordingly, the set of element data describing a road or a river include data defining lines and/or points that construct the road or river. On the other hand, certain types of elements may occupy a body of surface on a map. For example, lakes, forests and buildings are the elements occupying a body of surface on a map. Therefore, in one embodiment, the map data module 115 can further divide the body of surface into a set of smaller sections. For example, the map data module 115 determines a contour of the element and triangulates the contour using a triangulation algorithm. For example, the map data module 115 uses a triangulation algorithm to triangulate the contour of a lake and obtains a set of triangle portions consisting of the lake. The map data module 115 stores triangulation data describing the triangle sections.

In one embodiment, the map data module 115 also divides each layer into multiple tiles that each include segments of individual elements. The map data module 115 generates multiple sets of tile data describing tiles of a layer and each set of tile data includes segments or portions of individual elements of the layer. For example, a set of tile data describes a tile including segments of two road elements such as a segment of the highway 101 and a segment of the $23^{rd}$ street. In another example, a set of tile data describes a tile including a portion of a lake represented by a group of triangles. The map data module 115 stores tile data for each layer of the map.

In one embodiment, the map data module 115 receives query for tile data describing the tiles from the client devices 170 and provides the queried tile data to the client devices 170. For example, the client device 170 sends a query for tile data describing certain tiles that including a segment of the route for the bus 805 and stops along the segment to the map data module 115 via the network 150.

Alternatively, in one embodiment, the map data module 115 provides the processed map data including the layer data, the element data and/or the tile data to the client devices 170 automatically without receiving any query so that the client devices 170 can index the processed map data and store indexed and searchable processed map data locally.

A client device 170 is an electronic device used by a user to perform functions such as querying customized maps, consuming digital content, executing software applications, browsing websites hosted by web servers on the network 150, downloading files, and interacting with the map server 110. For example, the client device 170 may be a dedicated e-Reader, a smart phone, or a tablet, notebook, or desktop computer. The client device 170 includes and/or interfaces with a display device on which the user may view the customized maps. In addition, the client device 170 provides a user interface (UI), such as physical and/or on-screen buttons, with which the user may interact with the client device 170 to perform functions such as tapping on elements of maps, inputting a destination, selecting a POI, selecting elements (such as a specific highway) on the maps, zooming in and/or out the maps, and any other possible interactions with the maps. Furthermore, in response to the user interactions, the client device 170 provides customized maps to the users. For example, the client device 170 receives and stores the indexed and searchable processed map data locally so that the client device 170 can quickly build and return the customized maps that the users are willing to see.

In one embodiment, the client device 170 includes a map customization module 175. Other embodiments of the map server 110 include different and/or additional components. In addition, the functions may be distributed among the components in a different manner than described herein. An exemplary map customization module 175 is described in greater detail below with reference to FIG. 3.

The network 150 enables communications among the store server 110, client devices 170 and the external data source 160 and can comprise the Internet. In one embodiment, the network 150 uses standard communications technologies and/or protocols. In another embodiment, the entities can use custom and/or dedicated data communications technologies instead of, or in addition to, the ones described above.

Computing Machine Architecture

Figure 2:
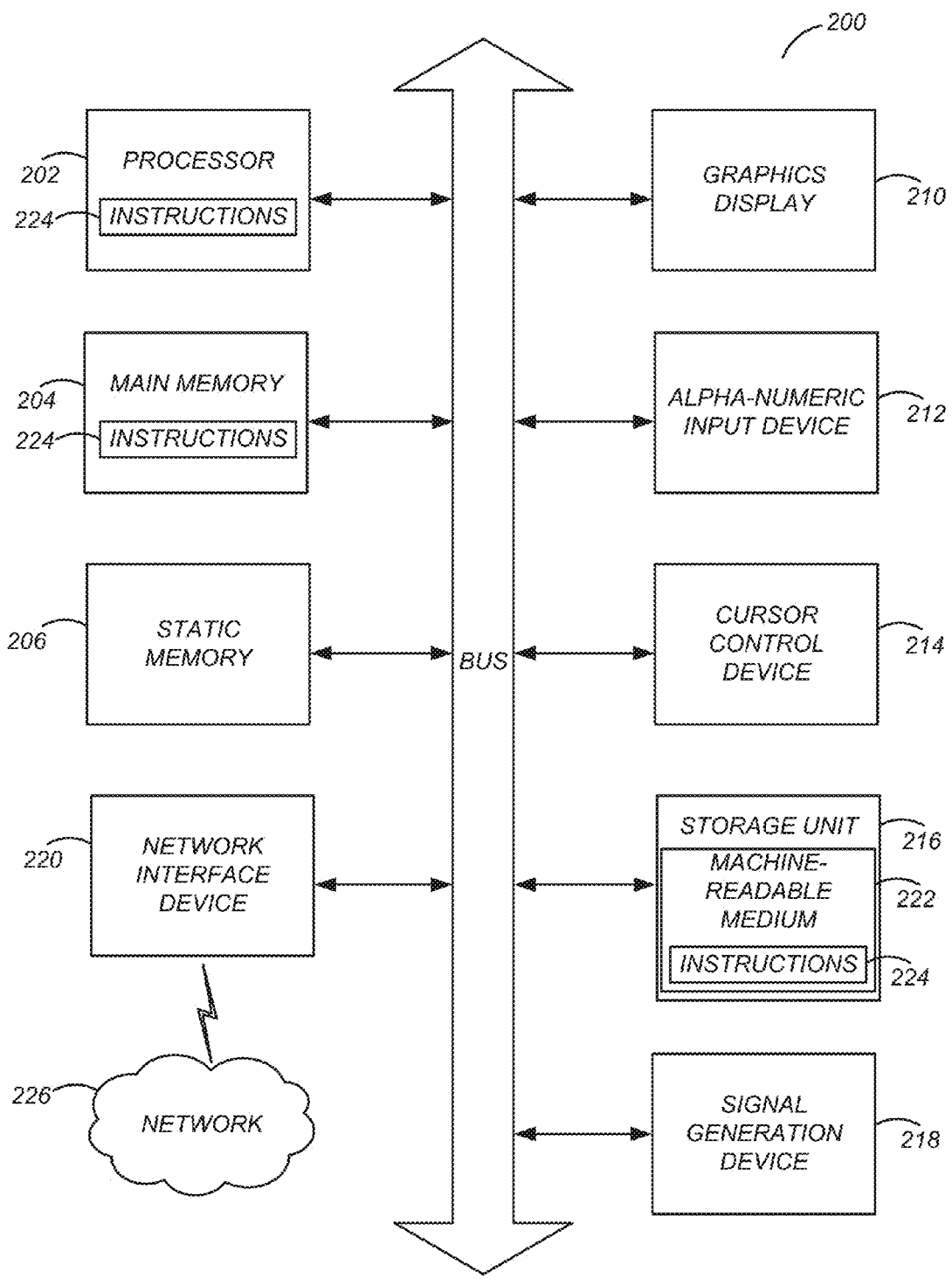
FIG. 2 is a block diagram illustrating components of an example machine able to read instructions from a machine-readable medium and execute them in a processor (or controller) for acting as a client device and/or map server according to one embodiment.

FIG. 2 is a block diagram illustrating components of an example machine able to read instructions from a machine-readable medium and execute them in one or more processors (or one or more controllers) (generally processor) for acting as a client device 170 and/or map server 110 according to one embodiment. Specifically, FIG. 2 shows a diagrammatic representation of a machine in the example form of a computer system 200 within which instructions 224 (e.g., software) for causing the machine to perform any one or more of the methodologies discussed herein may be executed, e.g., for rendering, analyzing, transmitting, providing and generating, etc. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 208. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 226 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Example Map Customization Module 175

Figure 3:
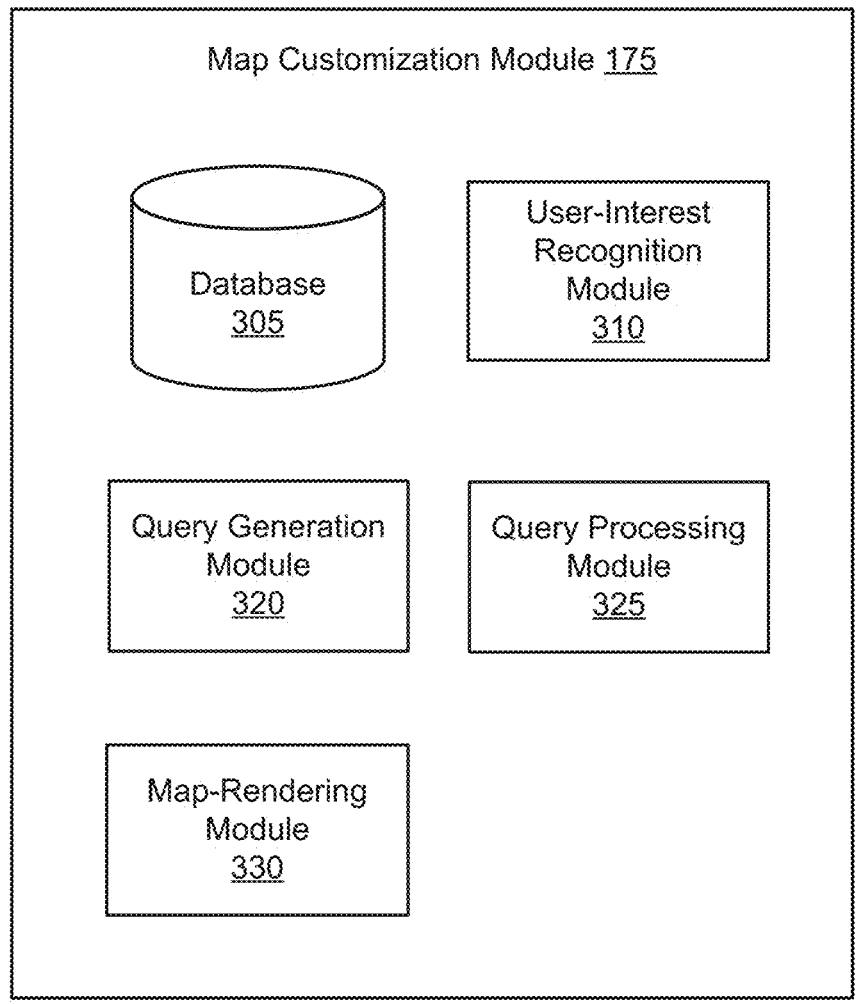
FIG. 3 is a high-level block diagram illustrating a map customization module of a client device according to one embodiment.

FIG. 3 is a high-level block diagram illustrating a map customization module 175 of the client device 170 according to one embodiment. In the embodiment shown, the map customization module 175 has a database 305, a user-interest recognition module 310, a query generation module 320, a query processing module 325 and a map-rendering module 330. Those of skill in the art will recognize that other embodiments of the map customization module 175 can have different and/or additional modules other than the ones described here, and that the functions may be distributed among the modules in a different manner.

The database 305 stores the processed map data including the layer data, the element data and/or the tile data related to maps. The processed map data is indexed and searchable directly on the client device 170. Therefore, by querying the local database 305, the client device 170 can obtain necessary processed map data locally and thus build a map for the user quickly without making a request to a server and waiting for response from the server. In one embodiment, the database 305 also stores other data necessary for the client device 170 to implement the functionalities described herein.

The user-interest recognition module 310 recognizes user interests based on explicit user input and/or implicit user input. The explicit user input indicates that users request a customized map. For example, the explicit user input includes user interactions with any element of a map. Using a touch surface or gestures of the client devices 170, users can specify their input. For example, a user taps on a route label to select a subway line; the user-interface recognition module 310 receives a user input indicating the user is willing to see the route of the subway line. In another example, a user taps on a bus stop label to select that bus stop; the user-interest recognition module 310 receives a user input indicating that the user is willing to check out that bus stop on the map. In yet another example, the user-interest recognition module 310 may also receive other types of user interaction such as user typing a name of a highway, a bus line, or a place. In one embodiment, when a user taps on a given point of the map that is associated with multiple elements, the user-interest recognition module 310 determines that the user may be interested in one or more of the multiple elements and provides a list of the multiple elements for the user to refine. The user-interest recognition module 310 can use heuristics to provide the list.

The implicit user input includes sensor data that helps the user-interest recognition module 310 to determine users' interests. The sensor data is data collected from various sensors of the client devices 170. For example, the user-interest recognition module 310 may retrieve current local time from the client device 170, and based on the local time the user-interest recognition module 310 determines that the user is interested in bus and train routes that are running in the current or next time slot. By retrieving current compass heading information from the client device 170, the user-interest recognition module 310 can determine that the user is interested in seeing a map that shows buses and trains in the direction specified by the compass heading information.

In one embodiment, the implicit user input can also include user information that helps the user-interest recognition module 310 to determine users' interests. For example, the user-interest recognition module 310 retrieves a user profile to determine what the user is willing to see on a map. In another example, the user-interest recognition module 310 may retrieves user history activities to determine users' interests about a map.

In one embodiment, the user-interest recognition module 310 combines the explicit user input and implicit user input to determine what elements users are willing to see on a map. For example, the user-interest recognition module 310 uses the current local time and an explicit user input such as the user taping on a bus route label to determine the user is willing to see the route of the bus running in the current or next time slot. In another example, based on a user's historical activities, the user-interest recognition module 310 determines that the user commutes during weekdays by taking a certain line of subway and determines this certain subway line is a default interest of the user. If the user taps on a shopping mall during the commuting hours such as 6:30 PM after work, the user-interest recognition module 310 may determine a candidate user interest as the user is willing to know how to get to the shopping mall from the subway line and provide it to the user along with other candidate interests such as a route from current location to the shopping mall, a route from home to the shopping mall, etc., to allow the user to refine.

In one embodiment, the user-interest recognition module 310 also allows the users to input their preferences for styles of the maps. For example, the users can specify the color of a route of a bus.

The query generation module 320 generates queries for data to build the customized maps for the users based on the determined interests of the users. For example, the query generation module 320 generates a query for a map showing the subway line tapped by the user. In another example, the query generation module 320 generates a query for a map showing the route of a certain bus running in the next hour. Alternatively, the query generation module 320 constructs queries based on more general user requests. The examples for the queries can include, but not limited to, a query for a map showing all train routes and bus routes from San Francisco, Calif. to San Jose, Calif., a query for showing all highways and gas stations, showing all parks, attractions, restaurants, bars and ATM locations, etc.

The query processing module 325 processes the queries responsive to receiving the queries and retrieves the queried map data from the local database 305. Since the map data is stored in the database 305 locally on the client device 170, the query processing module 325 can return queried map data quickly.

The map-rendering module 330 receives the returned map data such as tile data and applies a specified style sheet on the map data to draw the customized map on the client device 170. For example, as a user interacts with the map, such as panning, zooming in/out, and tapping on, different map elements, corresponding tile data describing the interacted map elements is returned to the map-rendering module 330 from the database 305. The map-rendering module 330 then can use the tile data to display the customized map on the client device 170 for the user.

In one embodiment, the map-rendering module 330 can provide custom styling of the maps via style sheets. Style properties for a single element or a group of elements can be defined and saved along with the element or elements in the database 305. Different style properties can further be defined for element or elements at different zoom levels. In one embodiment, the map-rendering module 330 can support the display of two-dimensional (2D) and three-dimensional (3D) maps. Examples can include 3D street names, 3D highway shield, and 3D bus stop label.

In one embodiment, the map-rendering module 330 provides the display of clustering of map elements. The multiple elements of the same type can be grouped into a single cluster. If a user taps on the cluster, the map-rendering module 330 will automatically zoom in to the right boundary and show the individual elements. If the user zooms out, individual elements will merge and form a cluster.

In one embodiment, the map-rendering module 330 can provide augmented reality view. The map-rendering module 330 takes into account various sensor readings, including GPS, compass and gyroscope, to create an immersive experience. When the user moves the client device 170 around, the map-rendering module 330 can automatically render a map showing the streets and related geo information in the current heading. When the user tilts the client device 170, the map-rendering module 330 can deliver different perspectives accordingly. In one example configuration the augmented reality is generated by styling some of the rendered element transparently and others solidly. This allows for views such as "see through" buildings to solid roads and their corresponding labels. By using the sensor readings from components of the computing device, e.g., the global positioning system (GPS) and gyroscope, a map is automatically rendered map that tilts and rotates. Separately, in one example embodiment a camera overlay can be introduced onto the map, which can then allow for taking pictures and posting the content on the map in one example embodiment. In another example embodiment, a user can draw on the rendered map and upload that content.

In one embodiment, the map-rendering module 330 provides a transparent view of a customized map. In a transparent view, the map elements are rendered in conjunction with a view captured by a camera coupled to the client device 170. In one example, the transparent view includes an overlay of streets, transit stops, and transit routes on a view captured by the camera. Further, the transparent view may include customized icons, such as points of interest, events, and recommended locations for various periods of time. Illustrations of exemplary transparent views of customized maps are presented in conjunction with FIGS. 16 and 17.

Example Methods

Figure 4:
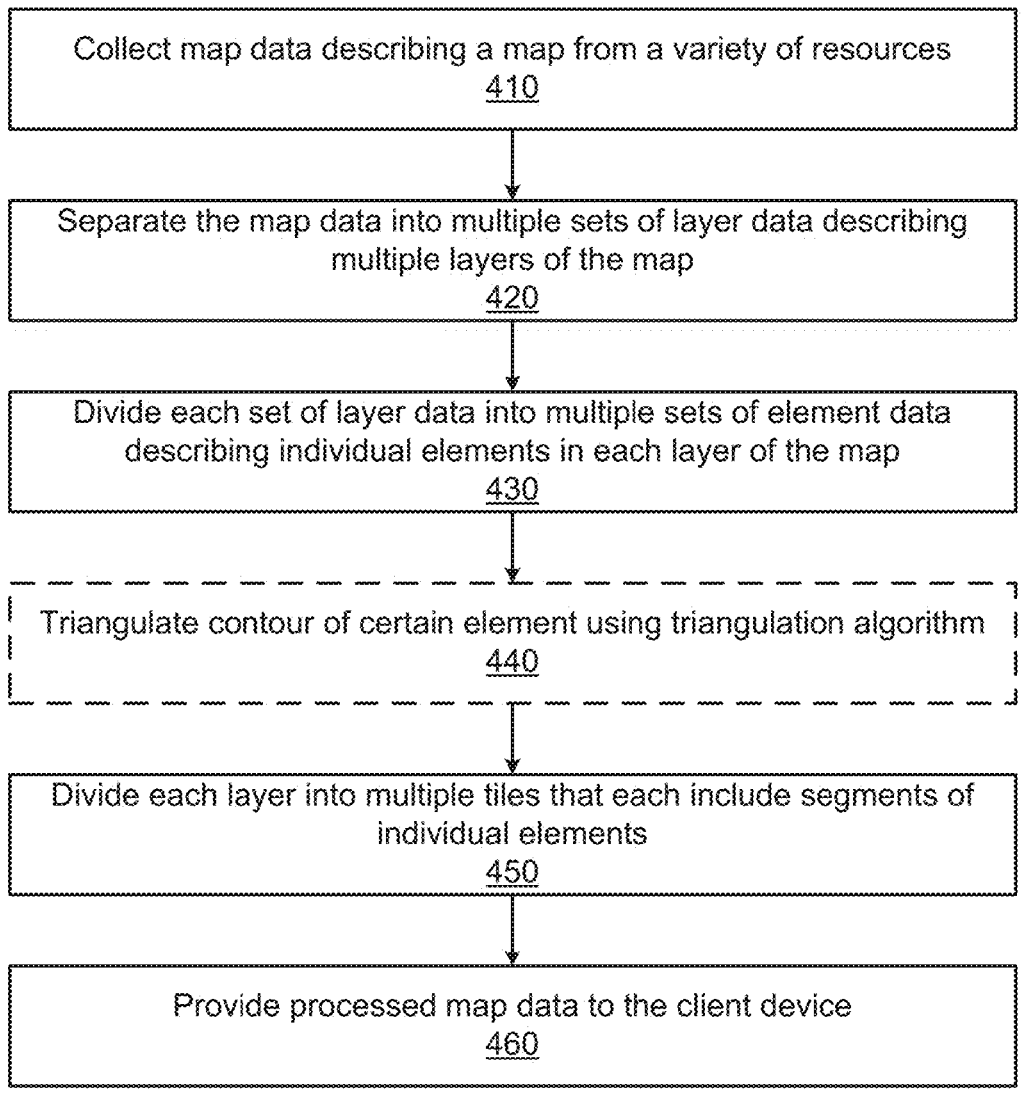
FIG. 4 is a flowchart illustrating an example method for generating data tiles according to one embodiment.

FIG. 4 is a flowchart illustrating a method for generating data tiles according to one embodiment. FIG. 4 attributes the steps of the method to the map data module 115 of the map server 110. However, some or all of the steps may be performed by other entities. In addition, some embodiments may perform the steps in parallel, perform the steps in different orders, or perform different steps.

Initially, the map data module 115 collects 410 map data describing a map from a variety of resources. The map data module 115 then separates 420 the map data into multiple sets of layer data describing multiple layers of the map. As described previously with regard to FIG. 1, each layer may include one type of elements. For example, a first set of layer data describes a layer including all roads of the map; a second set of layer data describes a layer including all buildings of the map; a third set of layer data describes a layer including all public transportation routes of the map; etc.

At step 430, the map data module 115 divides each set of layer data into multiple sets of element data describing individual elements in each layer of the map. For example, with regard to a layer of all public transportation routes, each set of element data may describe one public transportation vehicle's route, e.g., a certain bus line, a certain subway line, a certain train's route, etc.

At step 440, optionally the map data module 115 triangulates the contour of certain elements using a triangulation algorithm. Certain types of elements such as lakes, forests and buildings occupy a body of surface on a map. Therefore, the map data module 115 may further divide the elements into smaller sections by triangulating the contour of the elements. At step 450, the map data module 115 divides each layer into multiple tiles that each include segments of individual elements. As described previously with regard to FIG. 1, the map data module 115 generates multiple sets of tile data describing tiles of a layer and each set of tile data includes segments or portions of individual elements of the layer.

At step 460, the map data module 115 provides processed map data to the client device 170. The processed map data includes the layer data, the element data and/or the tile data describing layers, elements and tiles of the map.

Figure 5:
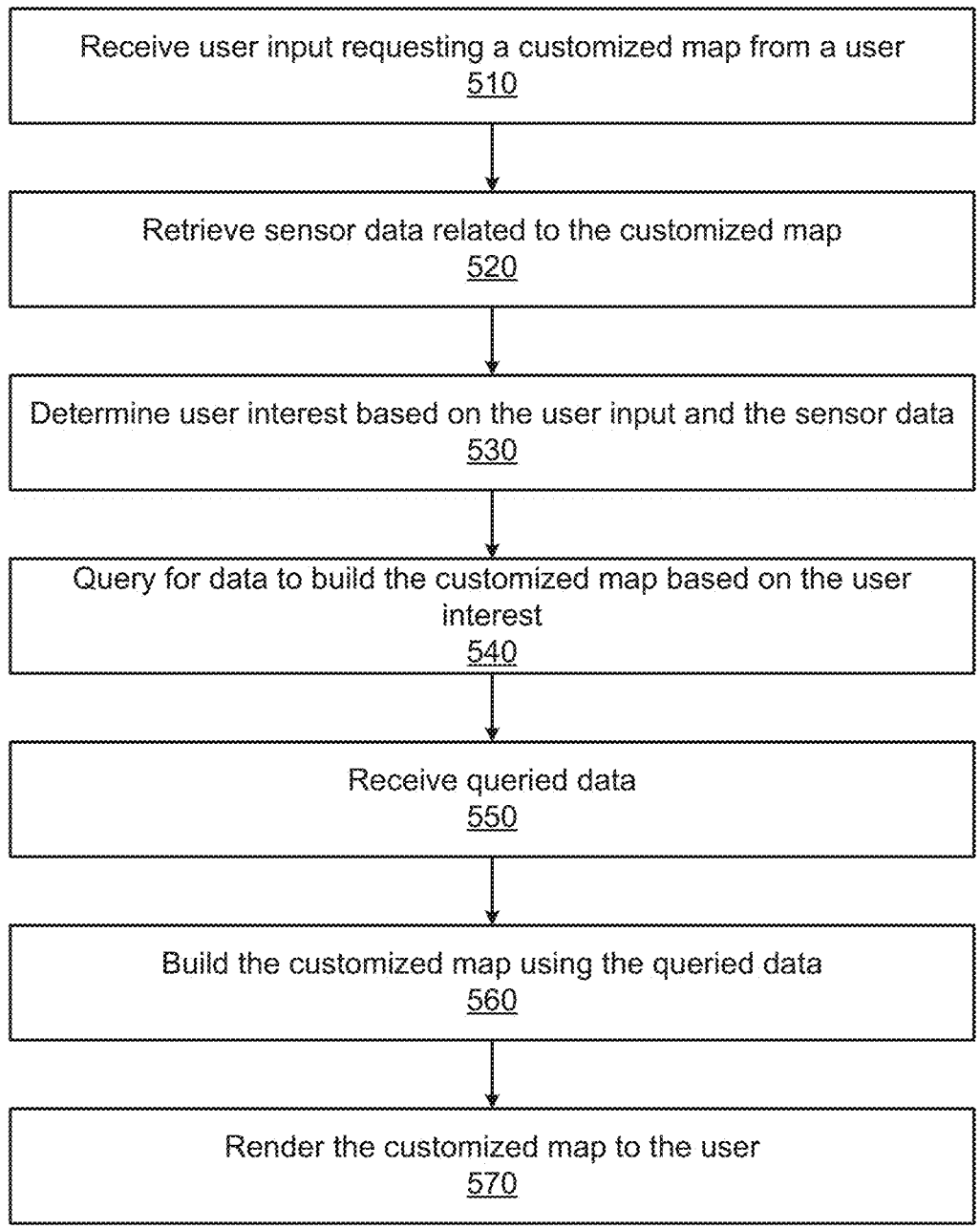
FIG. 5 is a flowchart illustrating an example method for rendering customized interactive maps to users according to one embodiment.

FIG. 5 is a flowchart illustrating a method for rendering customized interactive maps to users according to one embodiment. FIG. 5 attributes the steps of the method to the map customization module 175 of the client device 170. However, some or all of the steps may be performed by other entities. In addition, some embodiments may perform the steps in parallel, perform the steps in different orders, or perform different steps.

Initially, the map customization module 175 receives 510 user input requesting a customized map from a user. For example, the user input is an explicit user input such as user tapping on elements (e.g., a bus line label) of the map. The map customization module 175 also retrieves 520 sensor data related to the customized map. For example, the sensor data indicates a current time, location or heading direction of the client device 170. At step 530, the map customization module 175 determines user interest based on the user input and the sensor data. For example, based on the explicit user input and the sensor data described in the above examples, the map customization module 175 determines that the user is willing to see the route of the bus running in the next hours and to the heading direction and that the user may be also interested in seeing a nearby bus stop to the current location.

At step 540, the map customization module 175 queries for data to build the customized map based on the user interest. As described previously with regard to FIG. 3, the map customization module 175 may query for the processed map data stored in a local database. The map customization module 175 then receives 550 the processed map data and builds 560 the customized map using the queried data. At step 570, the map customization module 175 renders the customized map to the user.

Consider making public transit in a major city fully interactive and personalized on a client device 170. Multiple transit options, including subway, buses, trams, and commuter rail have to be supported by the client device 170. For example, there are 5-10 subway lines, more than 300 bus routes, more than 10 trams, and several commuter rail routes crisscrossing the city. On popular transport segments, many routes overlap. In addition, some of routes run only during morning and/or evening peak hours, some of them have limited and/or express runs, some of them only offer owl services. Each route is likely to have more than 15 stops, which means there are more than 5000 stops or stations. Some of routes share the same stations; some of the stops are in very close proximity with each other.

In this scenario, the user will be overwhelmed by being displayed hundreds of routes and thousands of stops. Instead, the present disclosure provides a process for surfacing only relevant routes and stops by making map fully interactive and context aware. The process includes the following steps. At step one, the process builds public transit data tiles. For example, the process uses a geo-point to represent each stop and uses a sequence of stops with direction and schedule information to represent each route. All transit data is processed and stored as a separate data layer on top of the base map.

At step two, the process detects and recognizes user input. For example, when a user taps on a stop label, the process determines that the user interested in information on that specific stop and then renders information on the specific stop to the user. When a user taps on a cluster of stops, the process provides information of all stops in that cluster. When a user taps on a route label, the process renders information on that specific route. When a user taps on a cluster of route labels, the process returns a list of possible candidate routes for the user to refine. If user is interested in more than one route, a multiple-selection is supported. In other examples, sensor data such as time is used as an implicit user input. Based on the current time, the process provides routes that are running in the current time slot, for example, at one hour interval. A compass heading may be also used as an implicit user input. Based on the current heading, the process returns routes that are correspond with heading in the direction.

At step three, the process queries map data for building the map that the user is willing to see. For example, based on the user input, the process constructs a complex query with conditions and logical operators. Since the map data is stored locally in the client device 170, the process searches the database directly on the client device 170 and immediately returns a set of map elements that meet the criteria.

At step four, the map data search results are passed and used to build the map. For example, the process interprets the results and draws on the screen of the client device 170 directly according a style sheet. In this way, the present disclosure beneficially provides users highly customizable interactive maps.

Example User Interfaces

Referring now to FIGS. 6-15, illustrated are graphical representations for user interfaces displaying different customized maps. For example, the customized maps shown in user interfaces can be rendered based on user input or selection.

Figure 6:
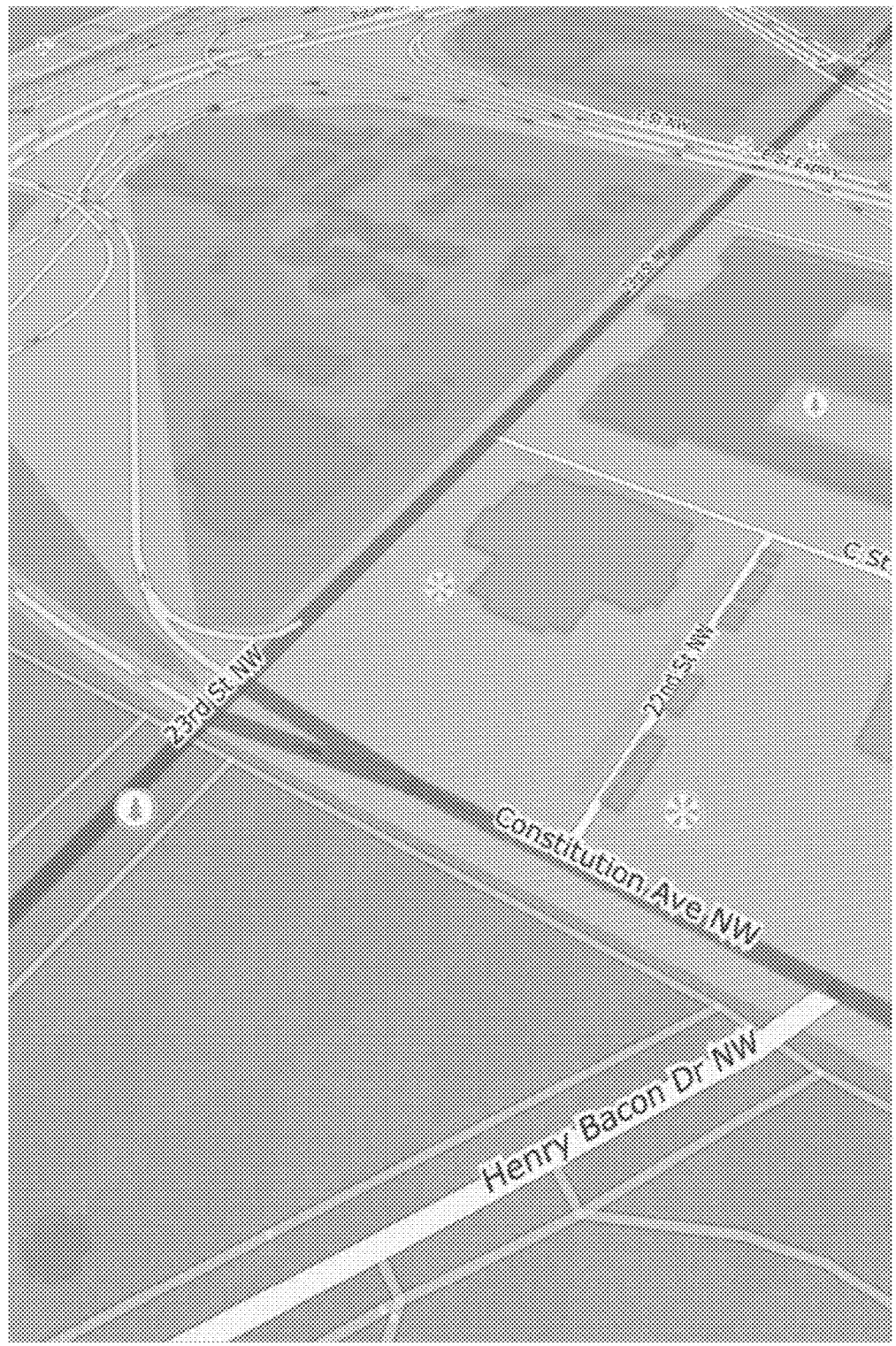
FIGS. 6-17 are graphical representations for example user interfaces displaying different customized maps.
Figure 7:
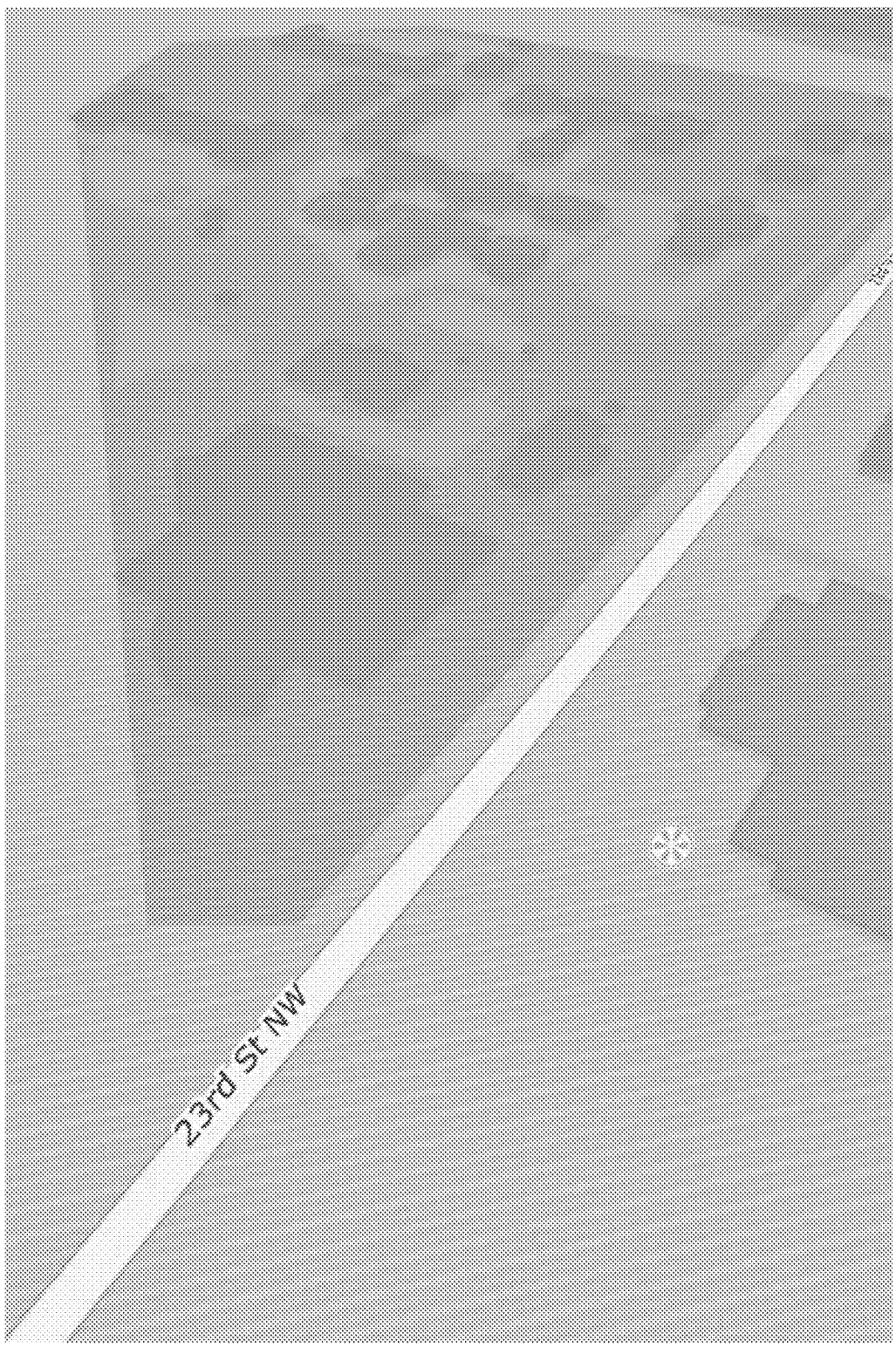

FIG. 6 illustrates a customized map showing all layers with the 23$^{rd}$ street and the constitution avenue in red. FIG. 7 illustrates a customized map showing only the 23$^{rd}$ street in the road layer. For example, the customized map is rendered in response to user tapping on the 23$^{rd}$ street.

Figure 8:
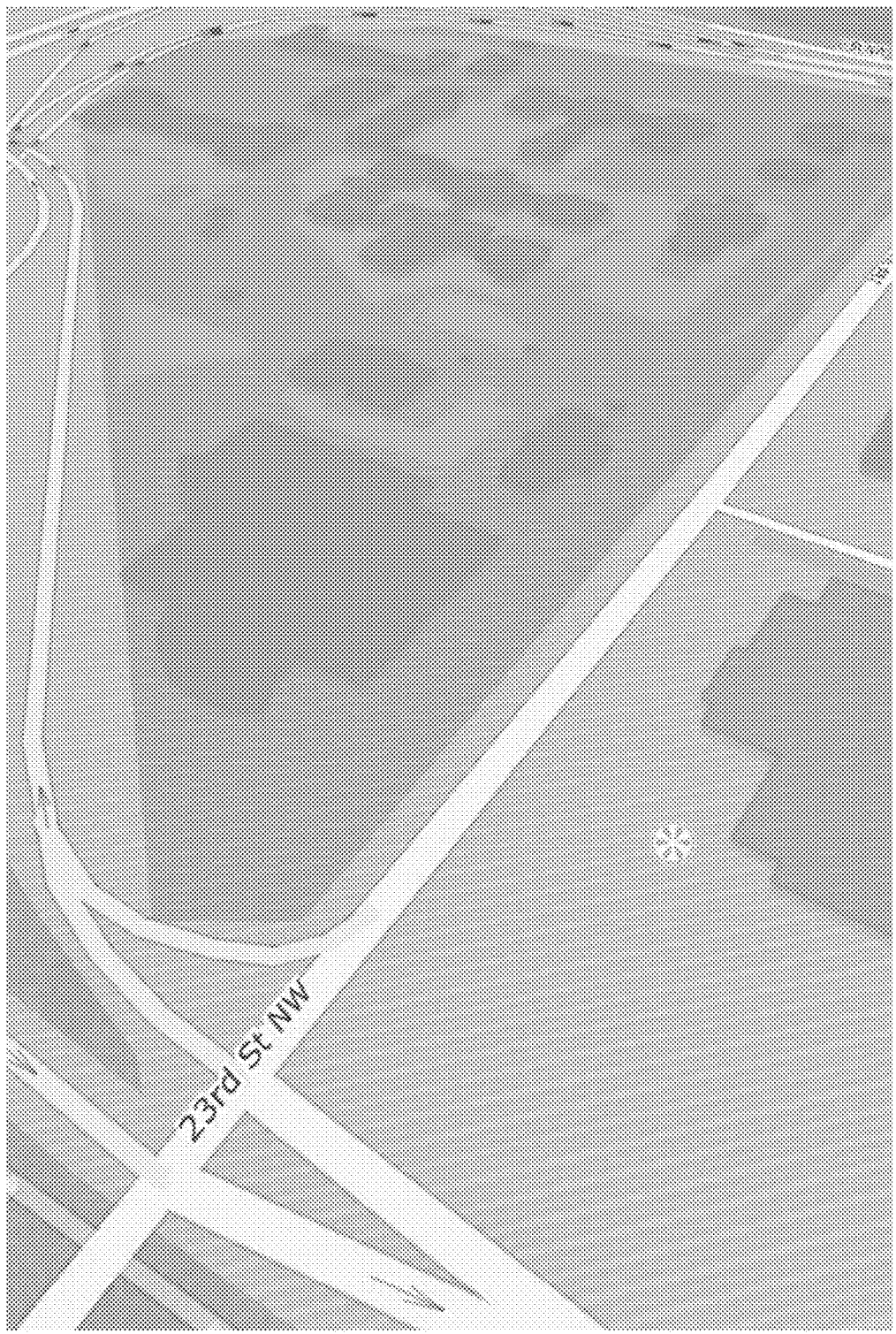
Figure 9:
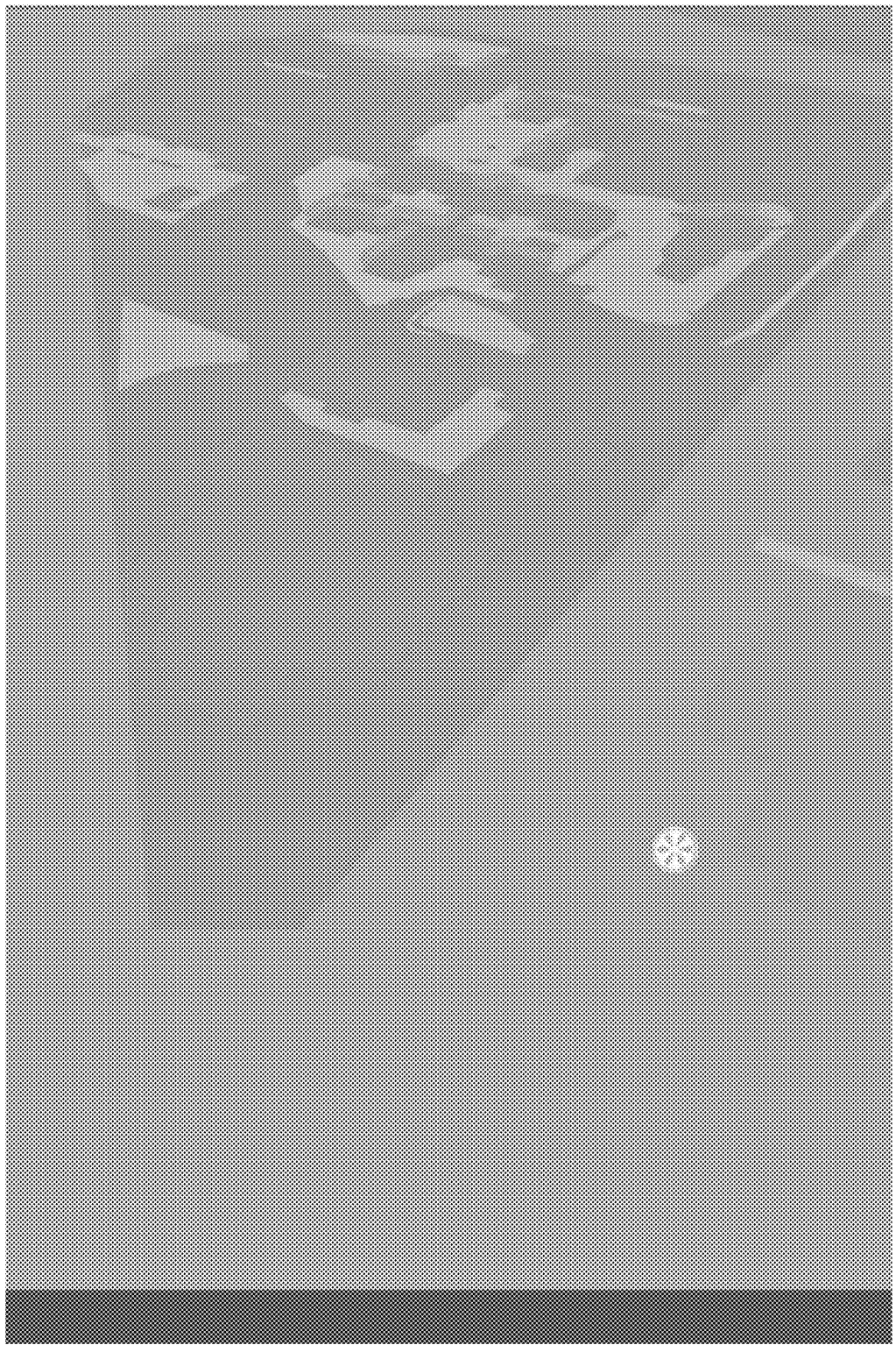
Figure 10:
Figure 11:
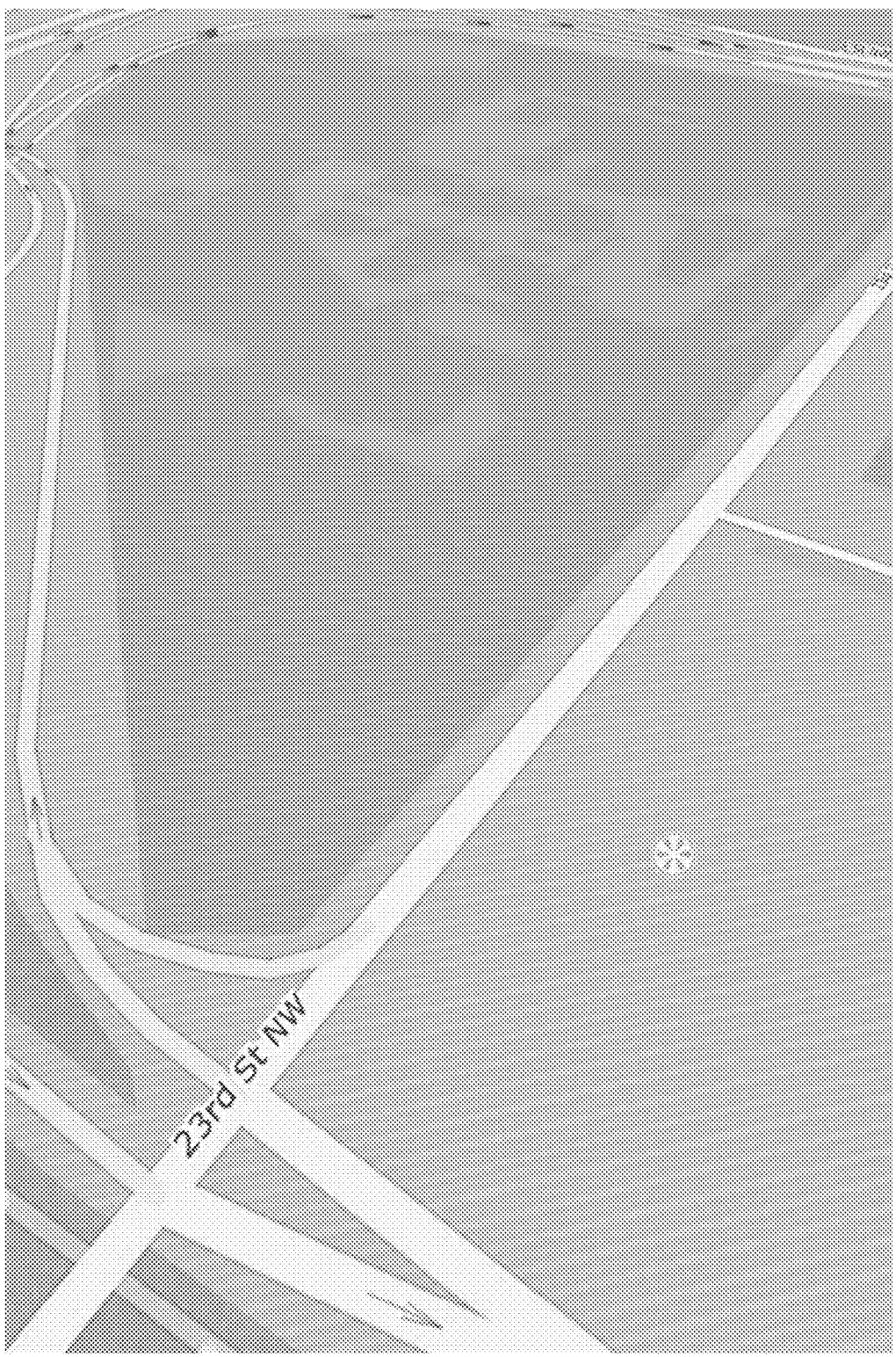
Figure 12:

FIG. 8 illustrates a customized map showing all roads. FIG. 9 illustrates a customized map with all roads hidden. FIG. 10 illustrates a customized map with a base layer hidden. For example, the base layer includes all lands. FIG. 11 illustrates a customized map with all buildings hidden. FIG. 12 illustrates a customized map with all points of interest hidden.

Figure 13:
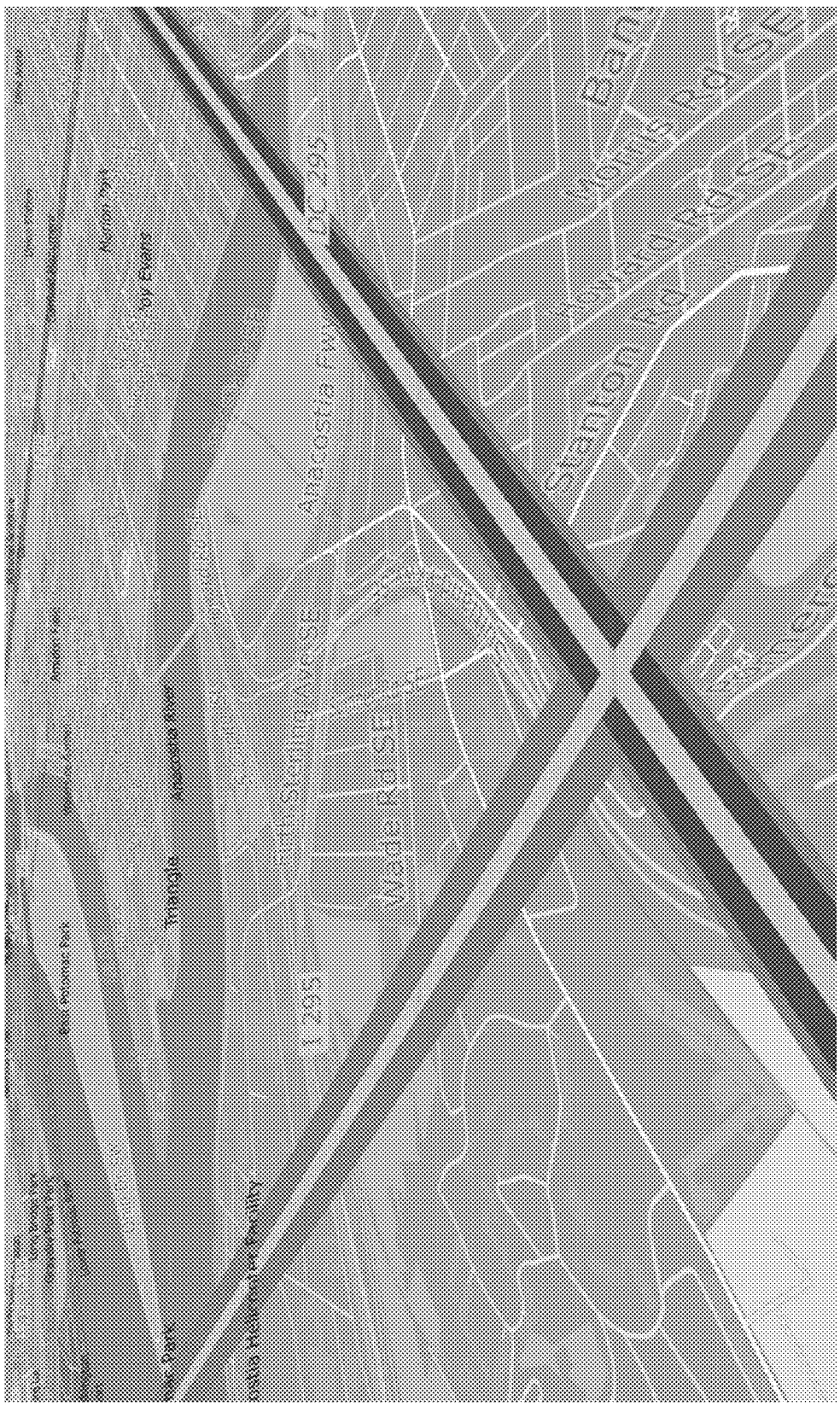
Figure 14:
Figure 15:
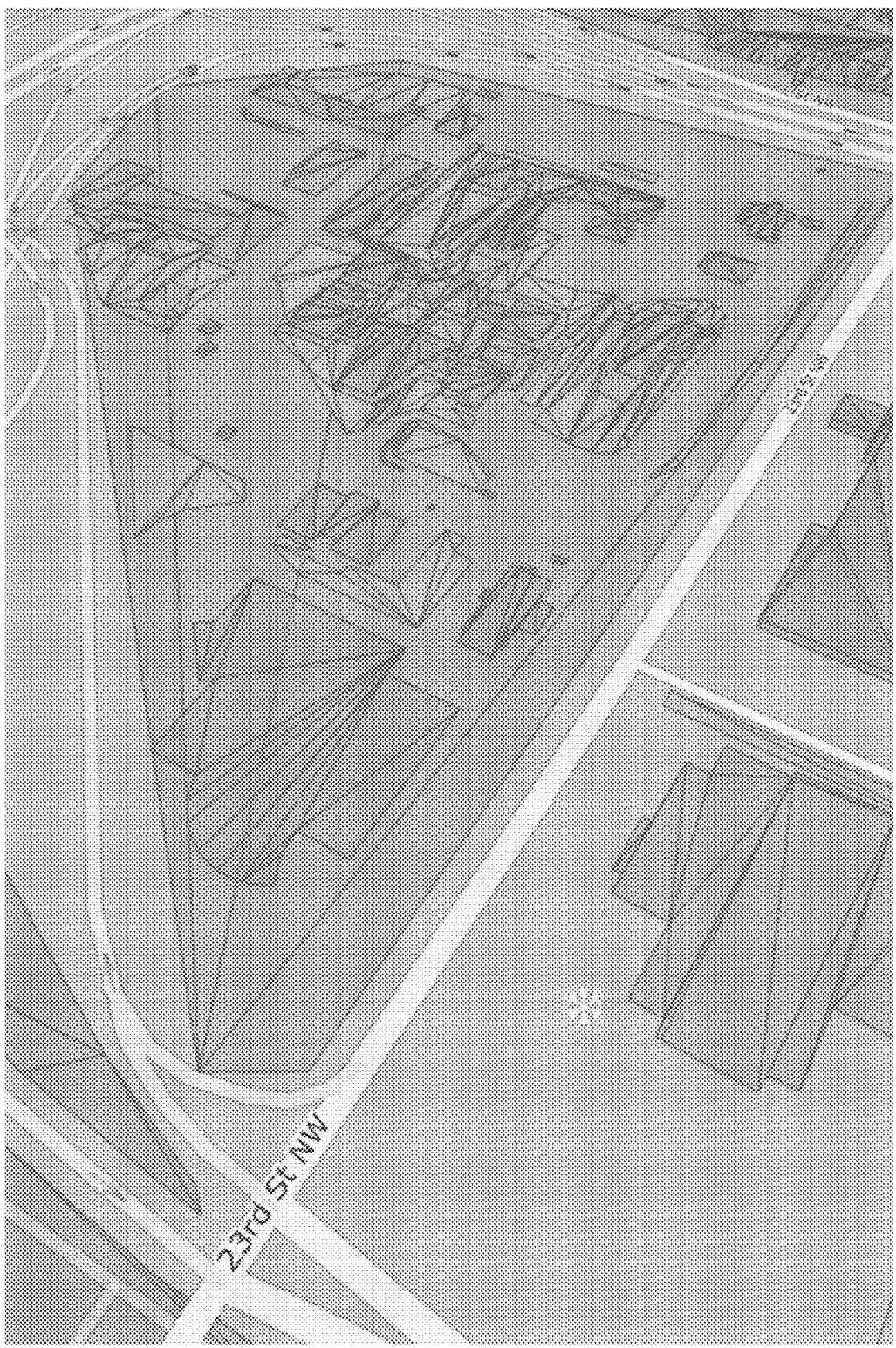

FIG. 13 illustrates a customized map showing tile borders and three layers. FIG. 14 illustrates a customized map showing tile borders and four layers. FIG. 15 illustrates a customized map showing the triangulated surfaces.

Figure 16:
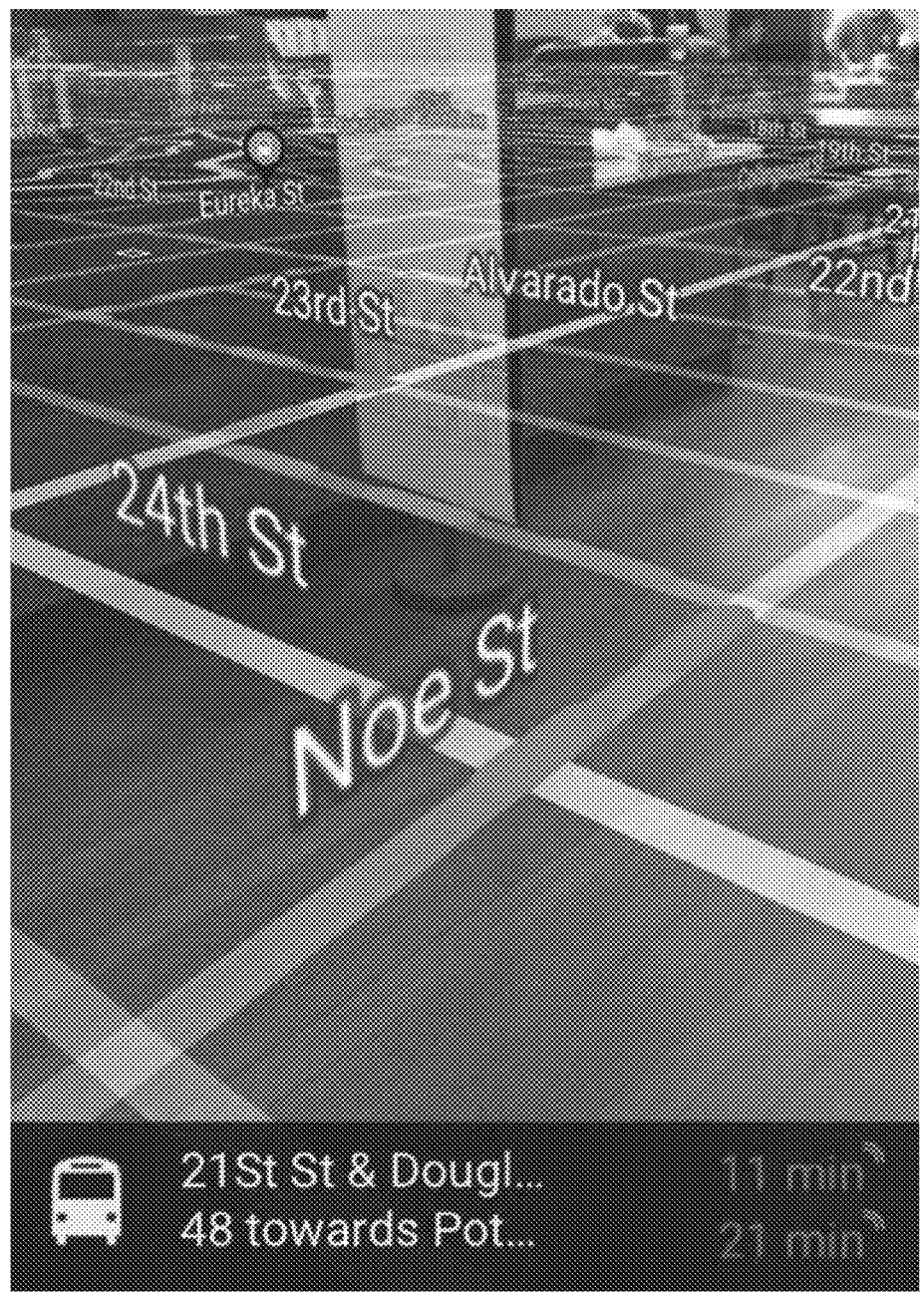
Figure 17:
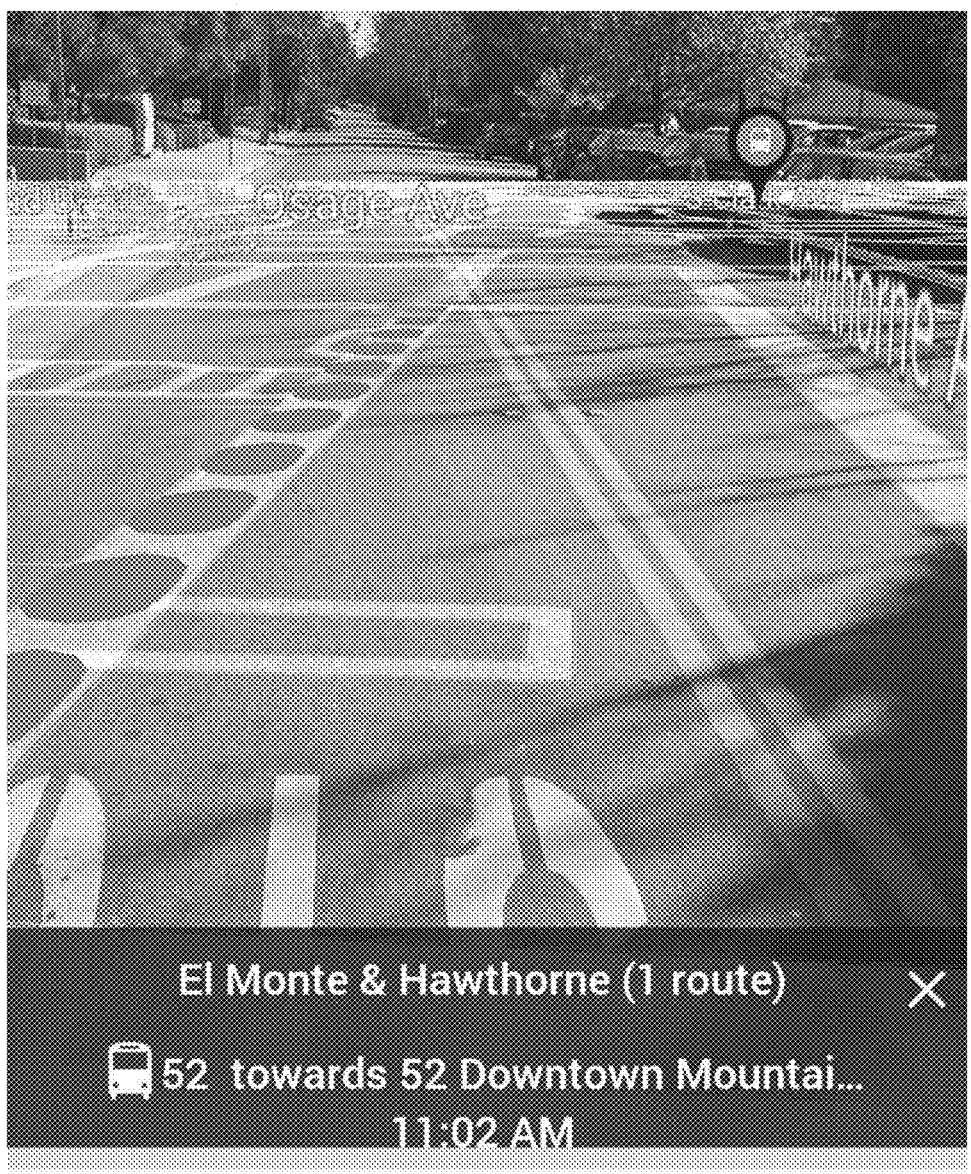

FIG. 16 illustrates a customized map with a transparent view of a path overlaid on a view captured by a camera. FIG. 17 illustrates a customized map with a transparent view of a path and a bus stop overlaid on a view captured by a camera.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein. Examples of modules include those described in FIGS. 1 and 3.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor, e.g., as described in FIG. 2) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., 202, that are temporarily configured (e.g., by software or computer program code embodied as instructions, e.g., 224) or permanently configured to perform the relevant operations. Whether temporarily or permanently configured, such processors 202 may constitute processor-implemented modules that operate to perform one or more operations or functions. The modules referred to herein, e.g., in FIGS. 1 and 3, may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating customized interactive map through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for providing tile data, the method comprising:
   collecting, using one or more processors, map data describing a map from a variety of resources;
   determining, using a current time local to a client device and a current compass heading of the client device, that a user of the client device is interested in a map that showing public transportation routes in a direction specified by the compass heading;
   separating, using the one or more processors, the map data into multiple sets of layer data describing multiple layers of the map, including generating a layer including public transportation systems in the direction specified by the compass heading;
   dividing, using the one or more processors, each set of layer data into multiple sets of element data describing individual elements in each layer of the map;
   dividing, using the one or more processors, each set of layer data into multiple sets of tile data, each set of tile data describing a tile of the each layer of the map, each tile including one or more segments of the individual elements; and
   providing, using the one or more processors, the tile data for display on the client device.

2. The method of claim 1 further comprising:
   identifying a contour of one individual element based on the element data; and
   triangulating the contour of the individual element using a triangulation algorithm.

3. The method of claim 1, wherein providing the tile data is responsive to a query for the tile data from a client device.

4. A computer-implemented method for rendering a customized map to a user, the method comprising:
   receiving, using one or more processors, a user input requesting the customized map from the user for display on a client device;
   determining, using a sensor, a current compass heading of the client device;
   determining, using the one or more processors, a current time local to the client device;
   determining, using the one or more processors, user interest associated with the customized map based on implicit user input inferred from the current compass heading, the user interest corresponding to public transportation in a direction specified by the compass heading;
   querying, using the one or more processors, for data to build the customized map based on the user interest, including querying for public transportation routes that correspond to the direction specified by the compass heading;
   receiving, using the one or more processors, the queried data;
   building, using the one or more processors, the customized map using the queried data; and
   rendering, using the one or more processors, the customized map to the user.

5. The method of claim 4, wherein the customized map includes visualization of one or more tiles of a certain layer of the map.

6. The method of claim 4, further comprising retrieving user information related to the customized map, wherein determining the user interest is also based on the user information.

7. The method of claim 4, further comprising retrieving context information related to the customized map, wherein determining the user interest is also based on the context information.

8. The method of claim 4, wherein rendering the customized map comprises providing a transparent view of the customized map overlaid on a view captured by a camera.

9. The method of claim 4, wherein determining the user interest further includes determining that the user is interesting in seeing a nearby bus stop.

10. The method of claim 4, wherein determining the user further includes determining that a certain subway line is of a default interest to the user, based on the user's historical activities.

11. The method of claim 4, further comprising querying for the public transportation routes running within a current time slot.

12. A non-transitory computer readable storage medium storing instructions for rendering a customized map to a user, the instructions when executed by a processor configured to cause the processor to:
   receive a user input requesting the customized map from the user for display on a client device;
   determine, using a sensor, a current compass heading of the client device;
   determine a current time local to the client device;
   determine user interest associated with the customized map based on implicit user input inferred from the current compass heading, the user interest corresponding to public transportation in a direction specified by the compass heading;

query for data to build the customized map based on the user interest, including query for public transportation routes that correspond to the direction specified by the compass heading;
receive the queried data;
build the customized map using the queried data; and
render the customized map to the user.

13. The computer readable storage medium of claim 12, wherein the customized map includes visualization of one or more tiles of a certain layer of the map.

14. The computer readable storage medium of claim 12, wherein the instructions are further configured to cause the processor to retrieve user information related to the customized map, wherein determining the user interest is also based on the user information.

15. The computer readable storage medium of claim 12, wherein the instructions are further configured to cause the processor to retrieve context information related to the customized map, wherein determining the user interest is also based on the context information.

16. The computer readable storage medium of claim 12, wherein rendering the customized map comprises providing a transparent view of the customized map overlaid on a view captured by a camera.

17. A computer system, comprising:
a processor; and
a map customization module executing on the processor and configured to:
receive a user input requesting the customized map from the user for display on a client device;
determine, using a sensor, a current compass heading of the client device;
determine a current time local to the client device;
determine user interest associated with the customized map based on implicit user input inferred from the current compass heading, the user interest corresponding to public transportation in a direction specified by the compass heading;
query for data to build the customized map based on the user interest, including query for public transportation routes that correspond to the direction specified by the compass heading;
receive the queried data;
build the customized map using the queried data; and
render the customized map to the user.

18. The computer system of claim 17, wherein the customized map includes visualization of one or more tiles of a certain layer of the map.

19. The computer system of claim 17, wherein the map customization module is further configured to retrieve user information related to the customized map, wherein determining the user interest is also based on the user information.

20. The computer system of claim 17, wherein rendering the customized map comprises providing a transparent view of the customized map overlaid on a view captured by a camera.

* * * * *